J. M. CANFIELD.
AUTOMOBILE SEMAPHORE.
APPLICATION FILED OCT. 30, 1916.
1,280,659.
Patented Oct. 8, 1918.
3 SHEETS—SHEET 2.
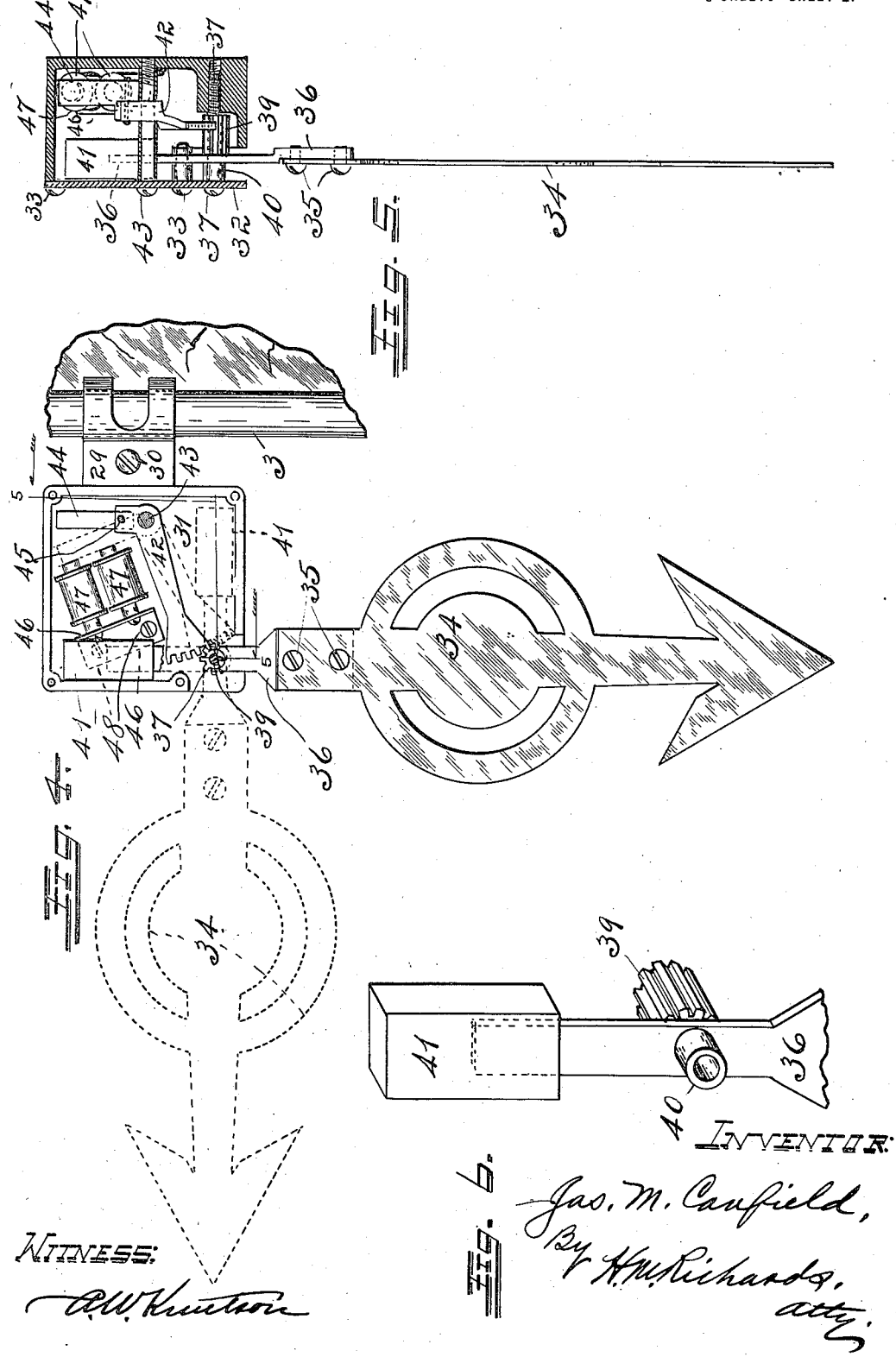

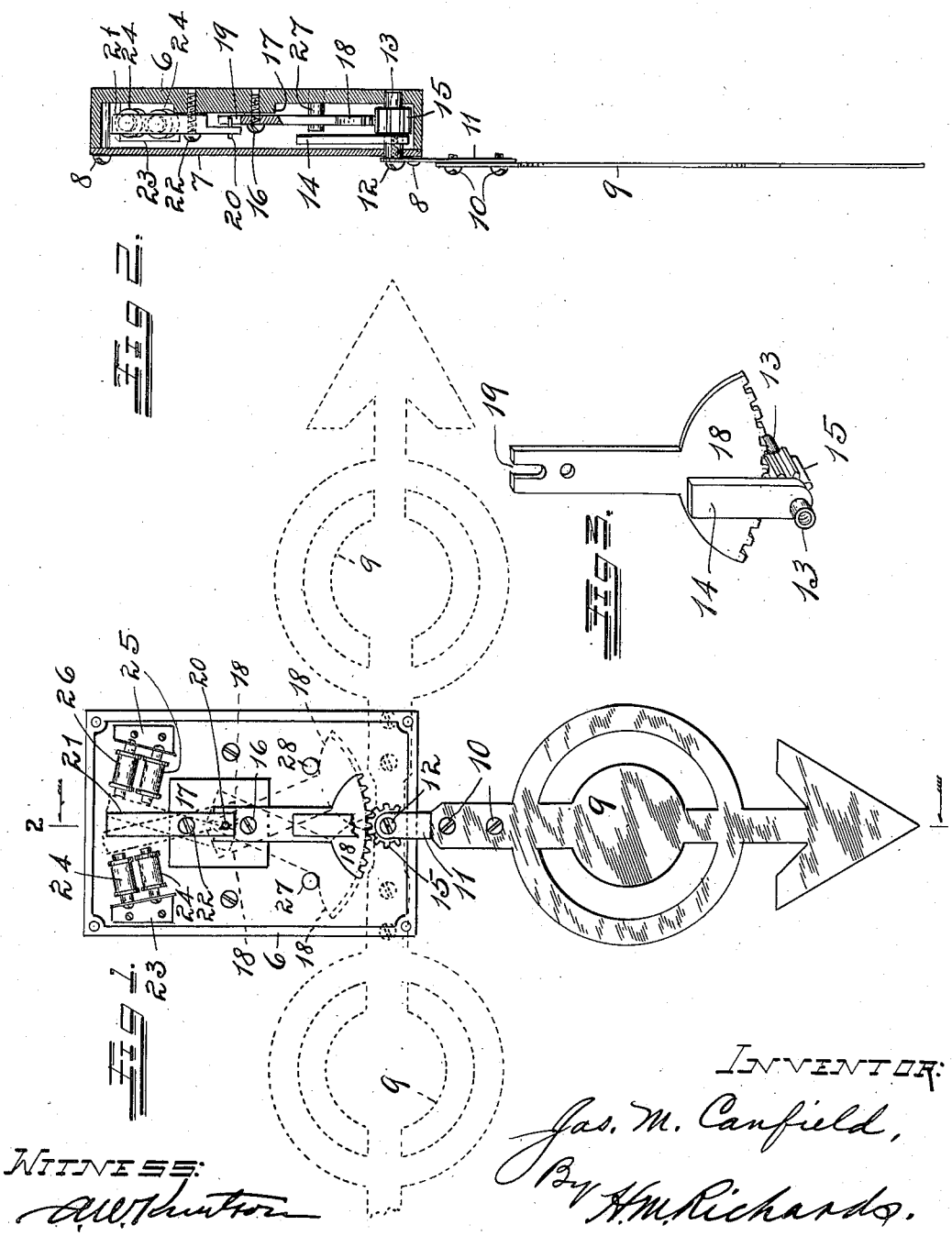

J. M. CANFIELD.
AUTOMOBILE SEMAPHORE.
APPLICATION FILED OCT. 30, 1916.
1,280,659.
Patented Oct. 8, 1918.
3 SHEETS—SHEET 3.
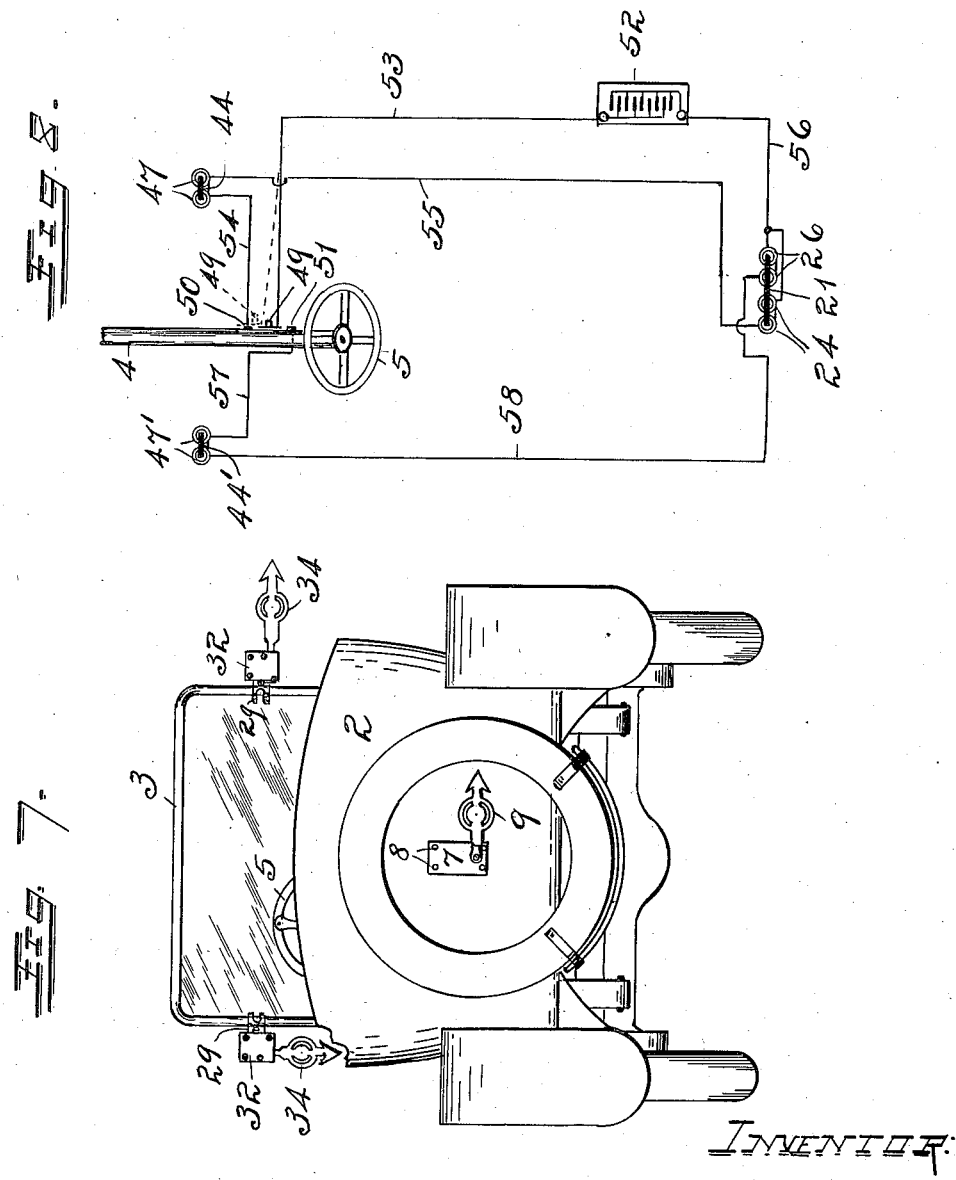

UNITED STATES PATENT OFFICE.

JAMES M. CANFIELD, OF CLAREMONT, CALIFORNIA.

AUTOMOBILE-SEMAPHORE.

1,280,659.　　　　　　　Specification of Letters Patent.　　　Patented Oct. 8, 1918.

Application filed October 30, 1916.　Serial No. 128,466.

*To all whom it may concern:*

Be it known that I, JAMES MARTIN CANFIELD, a citizen of the United States, and a resident of Claremont, in the county of Los Angeles and State of California, have invented a new and useful Automobile-Semaphore, of which the following is a specification.

The primary object of the invention, generally stated is to provide a novel signaling device, more especially purposed and intended for use on automobiles, arranged to indicate to occupants of other vehicles and to pedestrians either in front, in rear, or at the side, the direction in which it is intended to turn the vehicle, in order to avoid collisions and to give such warning to persons as will enable them to so act that danger will be eliminated.

The invention consists, substantially, in the novel features hereinafter described.

A preferred embodiment of the invention is illustrated in the accompanying drawings, in which the several elements, and the parts comprising which, are, wherever shown, each distinguished by a distinguishing reference character. In said drawings:

Figure 1 is an elevation of the rear signal and the means for operating it, the box or casing cover removed;

Fig. 2 is a transverse section taken in the line 2—2 in Fig. 1;

Fig. 3 is an enlarged perspective detail of certain operating-parts shown in Figs. 1 and 2 and presently fully described;

Fig. 4 is an elevation of one of the side signals, the cover removed;

Fig. 5, a transverse section taken in the line 5—5 in Fig. 4;

Fig. 6, an enlarged detail of certain parts shown in Figs. 4 and 5 and presently more fully described;

Fig. 7, a rear elevation, showing the arrangement and disposition of the semaphores or signals, as in operation; and Fig. 8, a symbolic plan view, showing a preferred structure for electrically operating the device.

Coming now to a detailed description of the drawings, and referring to each element and, where necessary, to each part thereof, by a distinguishing reference character, 2 indicates the rear end of the body of an automobile, the windshield being indicated by 3, the steering-post by 4 and the steering wheel by 5.

Referring now particularly to Figs. 1, 2 and 3, the numeral 6 denotes a box or casing secured in any suitable manner to the back of the vehicle body. 7 denotes a cover, and 8—8 screws whereby it is secured on the box proper.

9 indicates a signal-arrow or indicator the shaft of which is secured by screws 10 to an arm 11 which is pivoted on a bearing screw 12 which is threaded into the end of a shaft 13 the ends of which are mounted in bearings in the box 6 and cover 7. On said shaft are fixed a counterweight 14 and a pinion 15. Pivoted by means of a bearing-screw 16 to a boss 17 on the exposed face of the box 6 is the shank of a toothed sector 18 which meshes with the pinion 15. Said sector and shank constitute a lever of the first order, the power arm being much shorter than the load arm. Said shank has in its upper end a slot 19 which receives a pin 20 which is fixed in an armature 21 which is pivotally mounted by means of a bearing-screw 22 to the boss 17. Secured to an L-shaped plate 23 is a pair of electro-magnets 24, and secured to an L-shaped plate 25 is a pair of electro-magnets 26. Both these plates are suitably secured to the base or box 6. Any suitable insulation may be provided. 27, 28 indicate stop pins.

Now refer to Figs. 4, 5, 6 and 7. It will be noted that to each side of the windshield is secured a signal arrow or indicator and the mechanism for operating it. A description of but one will suffice, for they are duplicates.

29 designates a hanger or bracket secured to the windshield by a screw 30. To said hanger is secured a box consisting of a box proper 31 and a cover 32 united by screws 33.

34 denotes a signal arrow the shank of which is fixed by screws 35 to an arm 36 the upper end of which is pivotally mounted by means of a bearing screw 37. Said screw passes through an opening in the cover 32 and its point is threaded into an opening in an offset projection 38 in the box 31. It passes also through an axial opening in an integral pinion 39 and hub 40 which are suitably fixed in an opening in the arm 36. 41 is a counterweight secured on the upper end of said arm 36. 42 denotes a bell-crank shaped toothed sector which meshes with the pinion 39. It is fulcrumed on a screw 43 in the base 31, and constitutes a lever of the first order, the power arm of which is shorter than the load arm. An armature 44 is riveted at 45 to its power arm. 46 indicates an L-shaped block to which are secured a pair of electro-magnets 47. 48, 48 represent screws for securing the block 46 to the base 31. Any suitable insulation may be employed.

Refer now to Fig. 8. 49 indicates a slide button arranged on the steering post. 50 and 51 are contacts. Insulation may be provided wherever necessary. 52 is a storage battery.

For the purpose of simplifying and rendering more clear the operation I have applied to the magnets at the right hand side of the windshield the numerals hereinbefore stated, and have numbered those at the left hand side, 47'.

The full line showing at Fig. 8 shows the positions of the parts therein as neutral—the signals being therefore likewise. Assume the driver as desiring to turn to the right, as indicated in Fig. 7. He will push the slide button from the position shown by full lines in Fig 8 to the position shown by dotted lines therein, bringing it into contact with the contact 50 and closing the circuit which may be traced as follows:

Starting at the battery 52 the current will flow over the wire 53 to and through the contact 50, into the wire 54 and thence through the coils 47 to energize them and cause them to draw the armature 44 to the dotted line position shown in Fig. 4, causing the sector to move into the dotted line position indicated in same figure. Its teeth will impart movement to the pinion 39 and thus to the right hand arrow 34, which will assume the position shown in Fig. 7. Simultaneously the coils 47 and 24 being in series, the path of the current will be through the wire 55 and the coils 24 will be energized to draw the armature 21 to the left hand dotted line position shown in Fig. 1. The pin 20 (working in the slot 19) will move the upper end sector 18 to the right and the lower end thereof, through the instrumentality of the pinion 15, will throw the indicator 9 to the right. The stop pin 28 will limit the movement of the sector. From the coils 24 the current passes to the return wire 56 and thence to the battery.

To turn to the left the driver will slide the button 49 into contact with the contact 51. The current will flow from the battery 52 through the wire 53 through the switch 49—51, thence through the lead 57, to and through the magnets 47', whereby to magnetize them and cause the armature 44' to operate in a manner with that described of the armature 44, but, owing to the contrary order and disposition of the parts, the left hand indicator will be acted upon. Simultaneously the current is operating the magnet 26 through the lead wire 58 to cause the indicator 9 to be thrown to the left, the mechanical operation being the same as that described of turning it to the right. The current passes thence through the return 56 into the battery.

It has been stated herein that the power arms of both levers (sectors) 18 and 42 are shorter than the load arms thereof. Thus a relatively large burden would be imposed upon each in lifting the indicator were something not provided in order to afford relief. For this purpose I have provided the counterweights 14 and 41 respectively. In this connection it may be stated that the armature 44 constitutes an elongation of the power arm of the lever-sector 42 and affords a portion of the relief.

I realize that considerable variation is possible in the details of this construction without departing from the spirit of my invention; therefore I do not intend to limit or restrict myself to the exact form of either the mechanical or the electrical elements herein shown and described, except as pointed out in the following claim, in which it is my intention to claim all the novelty inherent in the general structure as broadly as is permitted by the state of the art.

Having thus set forth the nature, the preferred construction, the purposes and the operation of my invention, I claim as new the following, to-wit:

A device of the class described comprising a casing having formed centrally on the inner face of its rear wall a boss, a pair of spaced electro-magnets secured to the rear wall of said casing above said boss, an armature pivoted centrally to said boss and having its upper end located between said magnet, the lower end of said armature having a lateral pin thereon, a toothed segment located in said casing and having a vertically-disposed shank, the upper end of said shank provided with a slot to receive the pin of the armature, means pivotally connecting the segment shank to said boss beneath said armature, a hollow shaft journaled in said casing near the lower end thereof, a pinion secured to said shaft within said casing, said pinion meshing with the toothed segment, a supporting arm secured to said hollow shaft exteriorly of said casing, a signaling arrow secured to said supporting arm, a counterweight secured to said shaft to normally hold the supporting and signaling arrow vertically, and means to energize said magnets to cause movements of said supporting arm and signaling arrow.

In testimony that I claim the foregoing as my invention, I hereto subscribe my name this 16th day of October, 1916, at Claremont, Los Angeles county, California.

JAMES M. CANFIELD.